US008195002B2

(12) United States Patent
Osamoto et al.

(10) Patent No.: US 8,195,002 B2
(45) Date of Patent: Jun. 5, 2012

(54) ADAPTIVE POST-DERINGING FILTER ON COMPRESSED IMAGES

(75) Inventors: Akira Osamoto, Inashiki (JP); Osamu Koshiba, Tsukuba (JP)

(73) Assignee: Texas Instruments Incorporated, Dallas, TX (US)

( * ) Notice: Subject to any disclaimer, the term of this patent is extended or adjusted under 35 U.S.C. 154(b) by 1018 days.

(21) Appl. No.: 12/139,617

(22) Filed: Jun. 16, 2008

(65) Prior Publication Data
US 2008/0310750 A1    Dec. 18, 2008

Related U.S. Application Data

(60) Provisional application No. 60/943,877, filed on Jun. 14, 2007.

(51) Int. Cl.
*G06K 9/40*    (2006.01)
(52) U.S. Cl. ........ 382/275; 382/260; 382/261; 382/264; 345/611
(58) Field of Classification Search .................. 382/266, 382/264; 375/240.26, E07.2; 348/625, E05.064
See application file for complete search history.

(56) References Cited

U.S. PATENT DOCUMENTS

2005/0141619 A1* 6/2005 Kondo et al. ............ 375/240.24
2006/0132499 A1* 6/2006 Kim .............................. 345/611
2007/0071095 A1* 3/2007 Lim ......................... 375/240.08

OTHER PUBLICATIONS

SMPTE 421M, "Proposed SMPTE Standard for Television: VC-1 Compressed Video Bitstream Format and Decoding Process", Feb. 24, 2006.
ISO/IEC 14496-2, "Information technology—Coding of audio-visual objects, Part 2: Visual", 3rd edition, Jun. 1, 2004.

* cited by examiner

*Primary Examiner* — Jason M Repko
*Assistant Examiner* — David Perlman
(74) *Attorney, Agent, or Firm* — Mima Abyad; Wade J. Brady, III; Frederick J. Telecky, Jr.

(57) ABSTRACT

An image filtering method, apparatus and system, wherein the method comprising the steps of detecting at least one portion of an edge, wherein the portion of the edge provides an indication that ringing artifact are probable; subjecting at least one portion of a pixel, related to the at least a portion of the edge, to a low pass filter to produce a filtered pixel; and blending the filtered pixel with a value relating to the filter prior to filtering to produce a filtered image.

24 Claims, 6 Drawing Sheets

NO FILTERING

STRONG FILTERING WITH 5-PIXEL

STRONG FILTERING WITH 3-PIXEL

STRONG FILTERING WITH 3-PIXEL

NO FILTERING

ADAPTIVE POST-DERINGING FILTER ON COMPRESSED IMAGES

CROSS REFERENCE TO RELATED APPLICATIONS

This application claims priority from provisional application No. 60/943,877, filed Jun. 14, 2007, which is herein incorporated by reference.

BACKGROUND OF THE INVENTION

1. Field of the Invention

Embodiments of the present invention generally relate to a method and apparatus for filtering images.

2. Description of the Related Art

Among various combination of source and destination standard and dimension, the most significant mode will be a transcoding from MPEG-2 HDTV to H.264 HDTV. To achieve low bitrate with the highest picture quality, artifacts are usually removed from original MPEG-2 reconstructed images. If there are artifacts in the image, H.264 encoder (in the transcoder) reproduces the artifacts. Even when the artifacts do not affect the picture quality, they consume a considerable number of bits.

In most cases, transcoded bitstreams are allowed to use much less number of bits than original bitstreams. Thus, the reproduction of the artifact is imperfect. It undesirably emphasizes the artifacts in the transcoded images. The artifacts also disturb motion re-estimation and intra prediction mode decision. Therefore, noise filtering is an indispensable step for high quality transcoding, which is often called midfilter due to its location between a (MPEG-2) decoder and a (H.264) encoder. Dominant and typical types of MPEG-2 artifacts are ringing (also called mosquito noise in motion pictures) and deblocking noise.

Hence, artifacts should be removed for better subjective quality, as well as, high quality transcoding and better performance. However, the existing filters cannot show satisfactory performance on high-definition images.

Therefore, there is a need for an enhanced method and apparatus for dealing with artifacts in an image.

SUMMARY OF THE INVENTION

Embodiments of the present invention relate to an image filtering method, apparatus and system, wherein the method comprising the steps of detecting at least one portion of an edge, wherein the portion of the edge provides an indication that ringing artifact are probable; subjecting at least one portion of a pixel, related to the at least a portion of the edge, to a low pass filter to produce a filtered pixel; and blending the filtered pixel with a value relating to the filter prior to filtering to produce a filtered image.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
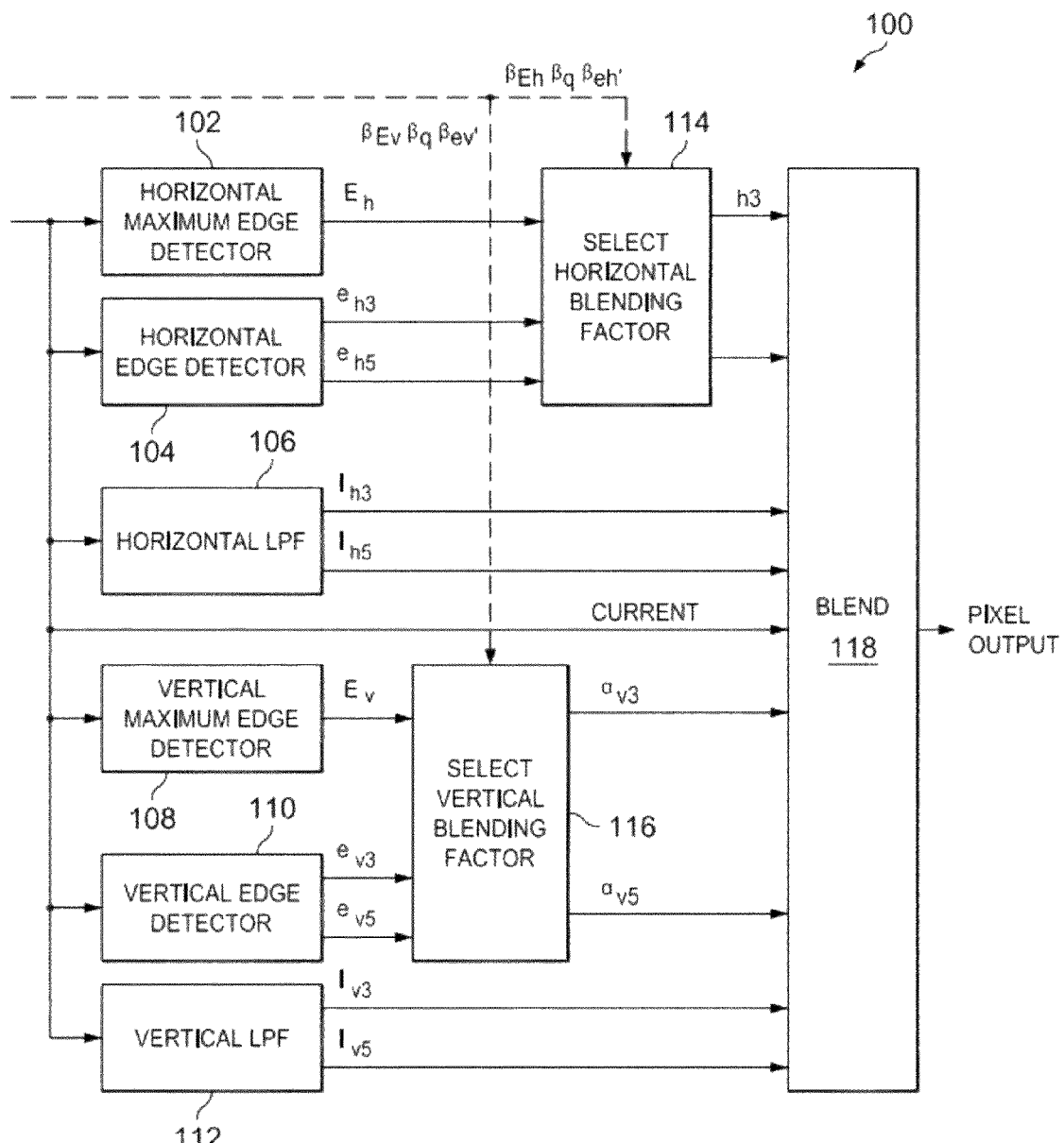
FIG. 1 is an exemplary embodiment of a block diagram of an image filtering system for an apparatus utilized for filtering an image in accordance with the present invention.

FIG. 1 is an exemplary embodiment of a block diagram of an image filtering system 100 for an apparatus utilized for filtering an image in accordance with the present invention. As shown in FIG. 1, the image filtering system 100 comprises a horizontal max edge detector 102, a horizontal edge detector 104, a horizontal LPF 106, vertical max edge detector 108, vertical edge detector 110, a vertical LPF 112 and a horizontal blending factor selector 114, a vertical blending factor selector 116, and a blender 118. The horizontal max edge detector 102 and the vertical max edge detector 108 detect the presence of edges in near location. For example, if there is a strong edge, pixels around such edge may suffer from ringing artifact and they are considered to be eligible of low pass filtering.

An intra-coded macroblock consists of DCT coefficients, not including motion compensated prediction. Therefore, by examining the DCT block relating to a pixel, the presence of ringing noise may be detected with accuracy. On the other hand, an inter-coded macroblock uses temporal prediction by motion compensation. Since motion compensated prediction are usually coded in DCT blocks with different boundary, they could suffer from ringing noise even when a DCT block does not include an edge. Hence, the detection of such ringing artifact is difficult. Therefore, it is beneficial to find edges with wider area than one DCT block (to which the macroblock that the pixel belongs). An exemplary embodiment for detecting the possible presence of noise is better described in FIG. 2.

In one embodiment, the image filtering system 100 may include 5-tap filter, which may be configured as a filter that has filter coefficients of [1, 0, 1, 0, 1/3], for example. This type of filtering is highly effective for vertical filtering of interlace image, which may apply the filter using only the same parity of interlaced fields. Furthermore, the formation of such distinctive filter coefficients may be used without interlace or progressive discrimination. As such, the image filtering system 100 may combine two (2) different low pass filter and blending factors. The first set of filter may be a 3-tap filter. Combining the second set of filter into the first set provides high capability of removing artifact from high-definition images and for coping with interlace images.

Utilizing image filtering system assists in removing ringing artifact more effectively from high high-definition images without introducing blurring. It may also be more effective for interlace images and progressive images. In addition, there is no incontiguous behavior that utilizes thresholds. The results are usually natural, consistent image quality. In addition, realizing the image filtering system 100 in hardware may require less resource than conventional inseparable two-dimensional filters.

Figure 2:
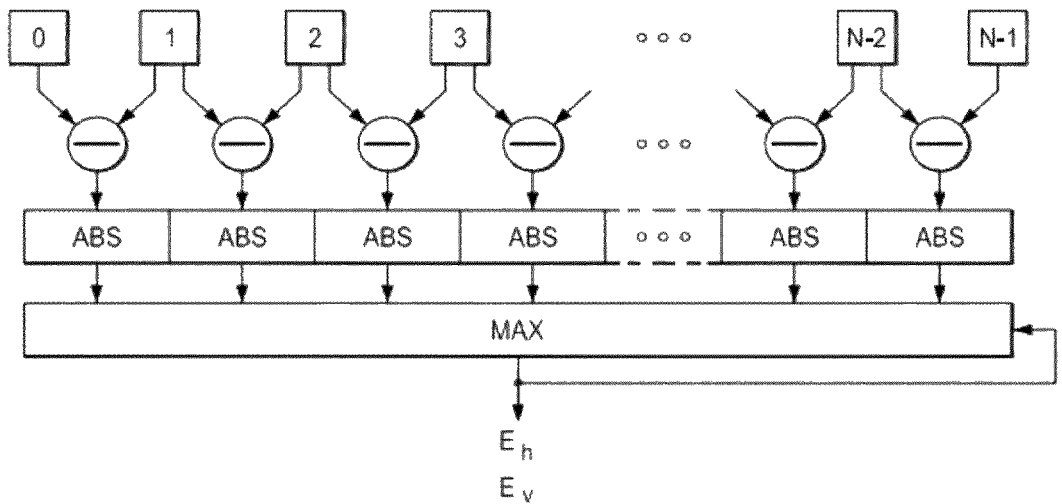
FIG. 2 is an exemplary embodiment of a detection of possible presence of noise in accordance with the present invention.

FIG. 2 is an exemplary embodiment of a detection of possible presence of noise in accordance with the present invention. Let l(x,y) be a component image (Y, Cb or Cr) to be filtered; a reconstructed image from an MPEG-2 bitstream. Let's consider applying filter to a pixel at ($x_0$, $y_0$). First, we define the neighbor of the pixel as follows: For luminance (Y) signals:

$$B(x_0, y_0; u, v) =$$

$$\begin{cases} I(r(x_0, 8) + u, r(y_0, 8) + v) & 0 \le u, v < 8 \quad (\text{intra } Mb \wedge \text{frame } DCT) \\ I(r(x_0, 8) + u, r(y_0, 16) + 2v) & 0 \le u, v < 8 \quad (\text{intra } Mb \wedge \text{field } DCT \wedge \text{top}) \\ I(r(x_0, 8) + u, r(y_0, 16) + 2v + 1) & 0 \le u, v < 8 \quad (\text{intra } Mb \wedge \text{field } DCT \wedge \text{bottom}) \\ I(r(x_0, 16) + u, r(y_0, 16) + v) & 0 \le u, v < 16 \quad (\text{inter } Mb) \end{cases}$$

$$r(m, n) = m - (m \% n),$$

where m % n is defined s the modulus operator.
That is, the neighbor of a pixel is the DCT block (for intra-coded macroblocks) or the macroblock (for inter-coded macroblocks) that includes the pixel for luminance signals. For chrominance (Cb and Cr) signals:

$$B(x_0, y_0; u, v) = I(r(x_0, 8) + u, r(y_0, 8) + v) \quad 0 \le u, v < 8$$

Denote $B(x_0, y_0; u, v)$ as $B(u, v)$ for readability. Then we get the degree of horizontal and vertical edge in the neighbor as the following equation.

$$E_h(x_0, y_0) = \max_{\substack{0 \le u < N-1 \\ 0 \le v < N}} |B(u, v) - B(u+1, v)|$$

$$E_v(x_0, y_0) = \max_{\substack{0 \le u < N \\ 0 \le v < N-1}} |B(u, v) - B(u, v+1)|$$

N denotes the size of the neighbor; N=16 for luminance signals in an inter-coded macroblock, otherwise N=8.

Figure 3:
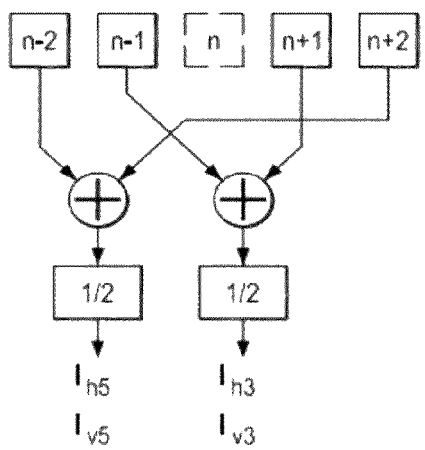
FIG. 3 is an exemplary embodiment of a low pass filter in accordance with the present invention.

Horizontal LPF 106 and Vertical LPF 112 generate low pass filtered values, show in FIG. 3. The values are blended with an original pixel value afterward. Low pass filtering may be applied using two different sets of pixels (1) Immediate right and left (horizontal filtering) or immediate upper and lower (vertical filtering) pixels. We use a suffix of "3" for this set because it forms a 3-tap filter and/or (2) Second nearest pixels to the right and the left (horizontal filtering) or second nearest pixels on the upper side and the lower side (vertical filtering). We use a suffix of "5" for this set because it is necessary to form a 5-tap filter.

Formally, we get 3-tap horizontal filtered value:

$$l_{h3}(x_0, y_0) = \begin{cases} (I(x_0, y_0) + I(x_0+1, y_0))/2 & (x_0 \bmod 8 = 0) \\ (I(x_0-1, y_0) + I(x_0, y_0))/2 & (x_0 \bmod 8 = 7) \\ (I(x_0-1, y_0) + I(x_0+1, y_0))/2 & (\text{otherwise}) \end{cases}$$

5-tap horizontal filtered value:

$$l_{h5}(x_0, y_0) = \begin{cases} (I(x_0, y_0) + I(x_0+2, y_0))/2 & (x_0 \bmod 8 < 2) \\ (I(x_0-2, y_0) + I(x_0, y_0))/2 & (x_0 \bmod 8 > 5) \\ (I(x_0-2, y_0) + I(x_0+2, y_0))/2 & (\text{otherwise}) \end{cases}$$

3-tap vertical filtered value:

$$l_{v3}(x_0, y_0) = \begin{cases} (I(x_0, y_0) + I(x_0, y_0+1))/2 & (y_0 \bmod 8 = 0) \\ (I(x_0, y_0-1) + I(x_0, y_0))/2 & (y_0 \bmod 8 = 7) \\ (I(x_0, y_0-1) + I(x_0, y_0+1))/2 & (\text{otherwise}) \end{cases}$$

5-tap vertical filtered value:

$$l_{v5}(x_0, y_0) = \begin{cases} (I(x_0, y_0) + I(x_0, y_0+2))/2 & (y_0 \bmod 8 < 2) \\ (I(x_0, y_0-2) + I(x_0, y_0))/2 & (y_0 \bmod 8 > 5) \\ (I(x_0, y_0-2) + I(x_0, y_0+2))/2 & (\text{otherwise}) \end{cases}$$

When source pixels of each filter and the pixel to be filtered belong to the different side of an edge (the pixel (d) in the example in FIG. 10 is an interesting exception), low pass filtered value may cause blurring. The horizontal edge detector 104 and vertical edge detector 110, shown in FIG. 1, detect such occurrence horizontally and vertically, respectively, to avoid picture quality degradation from blurring.

Figure 4:
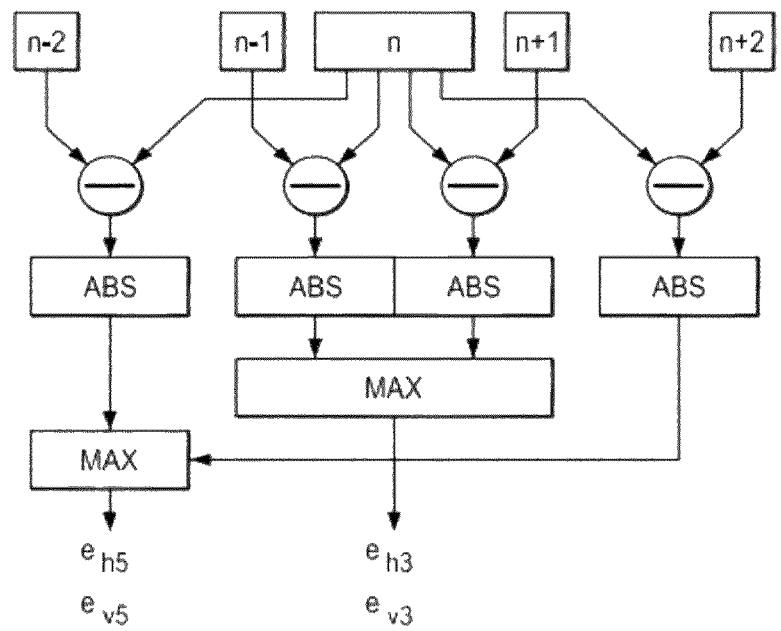
FIG. 4 is an exemplary embodiment of an edge detection in accordance with the present invention.

The detection is performed by detecting the difference between the target pixel to be filtered and the pixels that are used for low pass filtering, as shown in FIG. 4.

The degree of edge over 3-tap horizontal filtering:

$$e_{h3}(x_0, y_0) = \begin{cases} |I(x_0, y_0) - I(x_0+1, y_0)| & (x_0 \bmod 8 = 0) \\ |I(x_0-1, y_0) - I(x_0, y_0)| & (x_0 \bmod 8 = 7) \\ \max\{|I(x_0-1, y_0) - I(x_0, y_0)|, |I(x_0, y_0) - I(x_0+1, y_0)|\} & (\text{otherwise}) \end{cases}$$

The degree of edge over 5-tap horizontal filtering:

$$e_{h5}(x_0, y_0) = \begin{cases} |I(x_0, y_0) - I(x_0+2, y_0)| & (y_0 \bmod 8 < 2) \\ |I(x_0-2, y_0) - I(x_0, y_0)| & (y_0 \bmod 8 > 5) \\ \max\{|I(x_0-2, y_0) - I(x_0, y_0)|, |I(x_0, y_0) - I(x_0+2, y_0)|\} & (\text{otherwise}) \end{cases}$$

The degree of edge over 3-tap vertical filtering:

$$e_{v3}(x_0, y_0) = \begin{cases} |I(x_0, y_0) - I(x_0, y_0 + 1)| & (y_0 \mod 8 = 0) \\ |I(x_0, y_0 - 1) - I(x_0, y_0)| & (y_0 \mod 8 = 7) \\ \max\{|I(x_0, y_0 - 1) - I(x_0, y_0)|, |I(x_0, y_0) - I(x_0, y_0 + 1)|\} & (\text{otherwise}) \end{cases}$$

The degree of edge over 5-tap vertical filtering:

$$e_{v5}(x_0, y_0) = \begin{cases} |I(x_0, y_0) - I(x_0, y_0 + 2)| & (y_0 \mod 8 < 2) \\ |I(x_0, y_0 - 2) - I(x_0, y_0)| & (y_0 \mod 8 > 5) \\ \max\{|I(x_0, y_0 - 2) - I(x_0, y_0)|, |I(x_0, y_0) - I(x_0, y_0 + 2)|\} & (\text{otherwise}) \end{cases}$$

The final step of filtering is to blend the filtered values with the original pixel value. First, a blending factor for each low pass filtered value is determined select horizontal blending factor 114 and select vertical blending factor 116, shown in FIG. 1, select horizontal and vertical blending factors, respectively.

In one embodiment, the system uses larger blending factor when a strong edge is found in the neighbor (1) Use larger blending factor when quantization parameter that used to encode the macroblock is large; and (2) use smaller blending factor when the low pass filter might causes blurring.

Six predetermined adjustment parameters are used to determine each blending factor: $\beta_{Eh}$, $\beta_{Ev}$, $\beta_q$, $\beta_{eh}$, $\beta_{ev}$, and $\tau$, wherein $\beta_{Eh}$, $\beta_{Ev}$, $\beta_q$, $\beta_{eh}$, $\beta_{ev}$ are predefined parameters to control the weight of the above three factors ($0 \leq \beta_* \leq 225$). $\tau$ is also a pre-defined parameter to limit the overall strength of the filtering ($0 \leq \tau \leq 256$). The recommended values for the parameters are $\beta_{Eh} = \beta_{Ev} = 2$, $\beta_q = 1$, $\beta_{eh} = \beta_{ev} = 8$, $\tau = 170$. The upper bound of 170 is meant to limit the strength of the filter to "averaging" ($170 \approx 256 \times 2/3$).

Blending factor for 3-tap horizontal filtered value:

$$\alpha_{h3}(x_0, y_0) = \\ \text{Clip}(\beta_{Eh} E_h(x_0, y_0) - \beta_q Q(x_0, y_0) - \beta_{eh} e_{h3}(x_0, y_0), 0, \tau)/256$$

$$\text{Clip}(n, m, l) = \begin{cases} m & (n < m) \\ n & (n > l) \\ l & (\text{otherwise}) \end{cases}$$

where, $Q(x_0, y_0)$ denotes quantization scale for the macroblock the pixel $(x_0, y_0)$ belongs to.

Similarly, blending factor for 5-tap horizontal filtered value:

$$\alpha_{h5}(x_0,y_0) = \text{Clip}(\beta_{Eh}E_h(x_0,y_0)+\beta_q Q(x_0,y_0)-\beta_{eh}e_{h5}(x_0,y_0),0,\tau)/256$$

Blending factor for 3-tap vertical filtered value:

$$\alpha_{v3}(x_0,y_0) = \text{Clip}(\beta_{Ev}E_v(x_0,y_0)+\beta_q Q(x_0,y_0)-\beta_{ev}e_{v3}(x_0,y_0),0,\tau)/256$$

Blending factor for 5-tap vertical filtered value:

$$\alpha_{v5}(x_0,y_0) = \text{Clip}(\beta_{Ev}E_v(x_0,y_0)+\beta_q Q(x_0,y_0)-\beta_{ev}e_{v5}(x_0,y_0),0,\tau)/256$$

Figure 5:
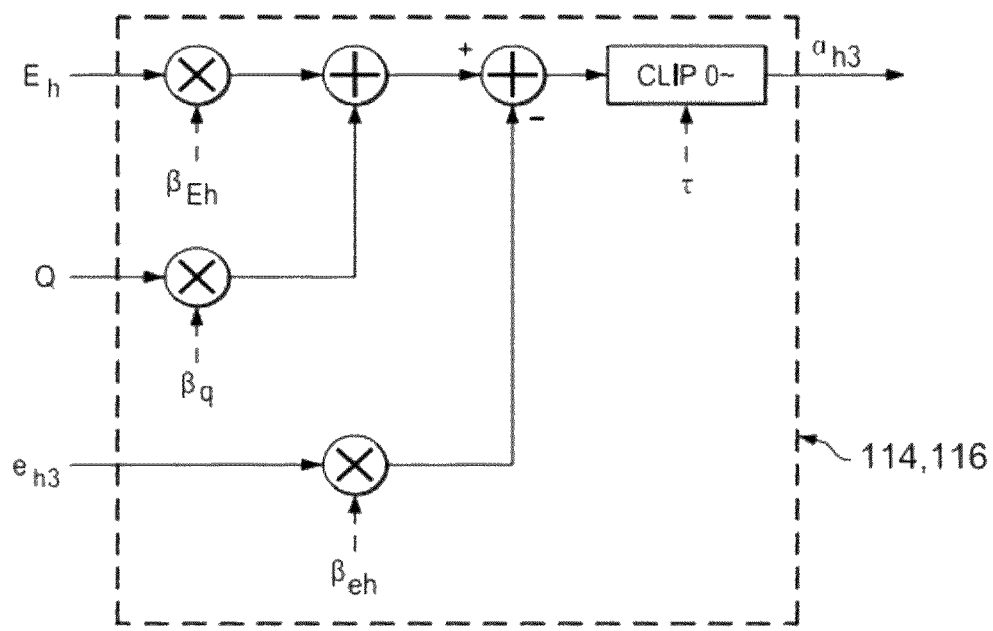
FIG. 5 is an exemplary embodiment for deciding blending factors in accordance with the present invention.

An exemplary embodiment for determining blending factor (items 114 and 116 of FIG. 1) is described in FIG. 5, which shows the 3-tap blending factor case.

First, we blend 3-tap filtered value into the original pixel value, and then blend 5-tap filtered value into it. This process is performed separately for horizontal and vertical filtered values.

Horizontal blending:

$$l_h(x_0,y_0) = \alpha_{h5}(x_0,y_0)l_{h5}(x_0,y_0)+(1-\alpha_{h5}(x_0,y_0))(\alpha_{h3}(x_0,y_0)l_{h3}(x_0,y_0)+(1-\alpha_{h3}(x_0,y_0))l(x_0,y_0))$$

Vertical blending:

$$l_v(x_0,y_0) = \alpha_{v5}(x_0,y_0)l_{v5}(x_0,y_0)+(1-\alpha_{v5}(x_0,y_0))(\alpha_{v3}(x_0,y_0)l_{v3}(x_0,y_0)+(1-\alpha_{v3}(x_0,y_0))l(x_0,y_0))$$

Figure 6:
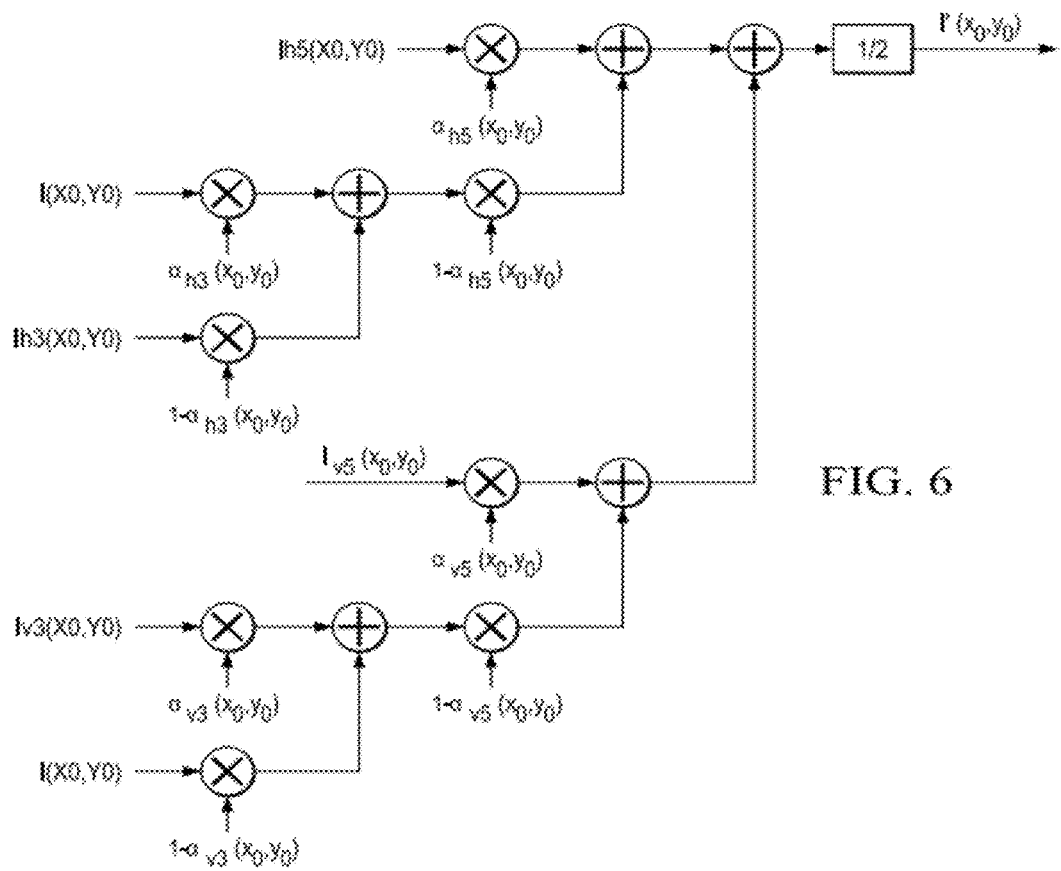
FIG. 6 is an exemplary embodiment for blending the horizontal and vertical blended values in accordance with the present invention.

As shown in FIG. 6, the horizontal blended value and vertical blended value are blended to get the final result of filtering.

$$I'(x_0, y_0) = \frac{I_h(x_0, y_0) + I_v(x_0, y_0)}{2}$$

Figure 7:
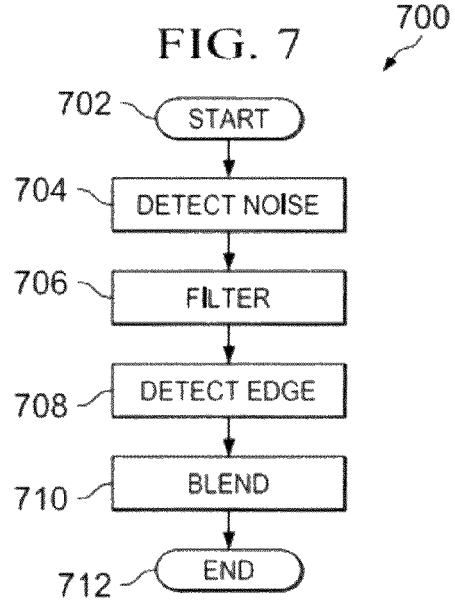
FIG. 7 is an exemplary flow diagram depicting an image filtering method in accordance with the present invention.

FIG. 7 is an exemplary flow diagram depicting an image filtering method 700 in accordance with the present invention. The method 700 starts at step 702 and proceeds to step 704. At step 704, the method 700 detects noise. At step 706, the method 700 utilizes a low pass filter. The method 700 proceeds to step 708, wherein the edges are detected. At step 710, the method 700 performs blending. The method 700 ends at step 712. It is important to note that the steps of the method 700 may occur in any order; for example, step 708 may take place before set 706, and so forth.

Figure 8:
FIG. 8 is a reconstructed image from a MPEG-2 bitstream (1920×1088i, 20 Mbps)
Figure 9A:
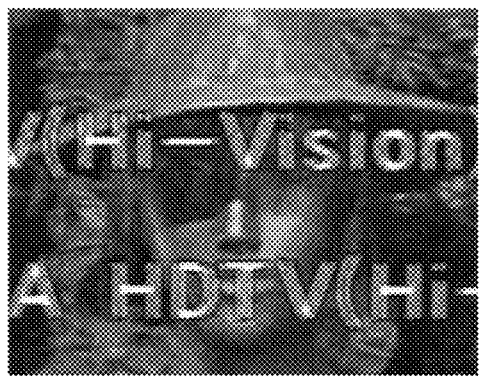
FIG. 9($a$)-($d$) are exemplary embodiments of the picture of FIG. 8 under going the filtering method of the present invention.
Figure 9B:
Figure 9C:
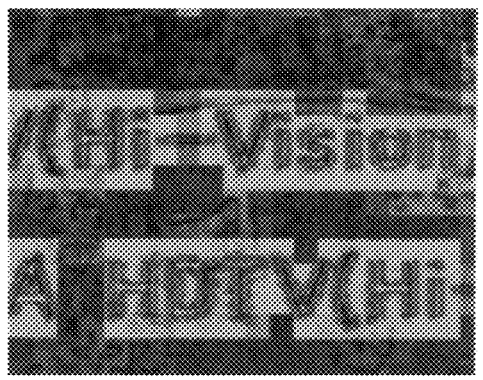
Figure 9D:
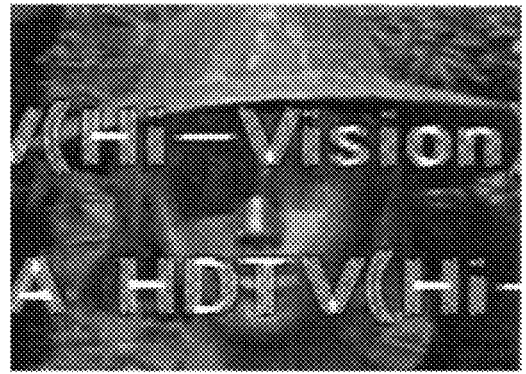
Figure 10A:
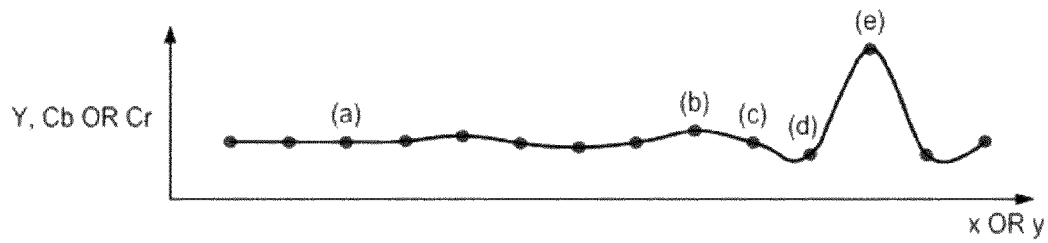
FIG. 10($a$)-($f$) are exemplary embodiments of extreme cases.
Figure 10B:
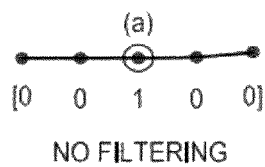
Figure 10C:
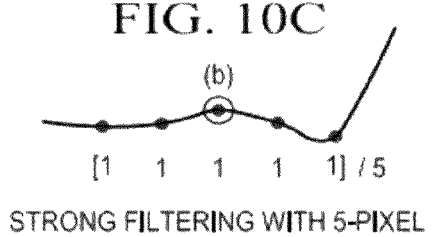
Figure 10D:
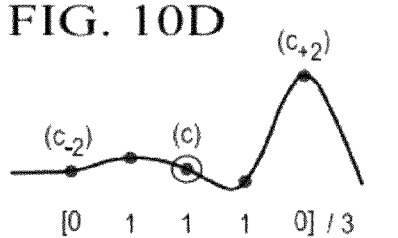
Figure 10E:
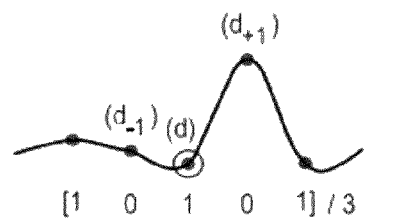
Figure 10F:
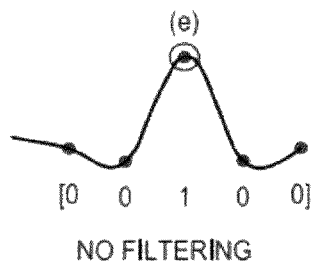

The method 700 may be based on the following strategies:
1. Apply filter macroblock by macroblock to reduce complexity. Filtering a macroblock does not need information and pixel values of other macroblocks.
2. Utilize several information of the MPEG-2 macroblock to be filtered to adaptively apply the optimum filter.
3. Apply low pass filter at pixels of 8×8 DCT blocks that might suffer from ringing noise. The strength of filtering depends on neighboring pixels.
4. Exclude pixels just along edges from filtering to avoid blurring.
5. Filtering may be applied horizontal and vertically, rather than two dimensional. Applying the filtering in such matter matches the process of MPEG-2 DCT transform; as a result, hardware realization may be easier than two-dimensional filters.
6. Realize 5-tap filter by combining two different 3-tap filters. This may result in highly flexible filtering with the lowest complexity FIG. 8 is a reconstructed image from a MPEG-2 bitstream (1920×1088i, 20 Mbps). FIG. 9(*a*) is a magnified version of FIG. 8. There is heavily visible ringing noise around characters. FIG. 9(*b*) is a filtered image using VC-1/MPEG-4 deringing filter. Ringing artifact is slightly mitigated but it is still easy to observe. FIG. 9(c) shows the distribution of blending factor in a deringing filter; four blending factors are added together to get one image. Larger blending factor (that is, stronger filtering) is represented as brighter pixels. One may observe that the example deringing filter of this invention applies filter strongly, but it does not filter edges around characters. The brim of the hat is also excluded from filtering. FIG. 9(d) shows the filtered image by the example deringing filter. The ringing artifact is much less than (b). The difference may be seen around the character of "(Hi" in the left-top part of the image, for example.

FIG. 10 depicts some examples of extreme cases. The term "extreme" means that the strength of low pass filtering used in the examples is either the weakest (no filter applied) or the strongest (averaging) and medium between the two is not used.

Pixel (a): No filter is applied because there is no significant edge in its neighbor. The definition of "neighbor" as shown in FIG. 2 and its description.

Pixel (b): The strongest filter is applied using neighboring five pixels because there is a significant edge in its neighbor and there is no significant difference among the neighboring five pixels. This suggests that the pixel might suffer from ringing noise and that applying a strong filter to the pixel will not cause blur.

Pixel (c): The strongest filter is applied using neighboring three pixels because there is a significant edge in its neighbor. Unlike the pixel (b), there is a significant difference between (c) and ($c_{+2}$). Therefore, pixel ($c_{+2}$) is excluded from filtering. The pixel ($c_{-2}$) is also excluded from filtering to make the filtering process simpler.

Pixel (d): The strongest filter is applied using three pixels because there is a significant edge in its neighbor. Unlike the pixel (b), there is a significant difference between (d) and ($d_{+1}$). Therefore, pixel ($d_{+1}$) is excluded from filtering. The pixel ($d_{-2}$) is also excluded from filtering to make the filtering process simpler. This mode is a distinctive characteristic of the proposed algorithm. It works well on a thin edge like this example. It is very effective for vertical filtering on interlace images, also. In an interlace image, different fields may have to be filtered separately because they hold an image shot at different timing. Filtering as progressive image, however, may be more effective for still (motionless) region. Having the mode like pixel (d) may automatically configure the filtering characteristics for both situations.

Pixel (e): The pixel is not filtered to avoid blurring, because it is on an edge.

While the foregoing is directed to embodiments of the present invention, other and further embodiments of the invention may be devised without departing from the basic scope thereof, and the scope thereof is determined by the claims that follow.

What is claimed is:

1. An image filtering method, comprising the steps of:
   subjecting at least one portion of a pixel to a low pass filter to produce a filtered pixel;
   detecting at least one portion of an edge, relating to the filtered pixel, wherein the portion of the edge provides an indication that ringing artifact are probable, wherein the step of detection the at least one portion of the edge detects an area wider than a DCT Block; and
   blending the filtered pixel with a value relating to the pixel prior to filtering to produce a filtered image, wherein the step of blending comprising the steps of:
   blending a 3-tap filtered value into the at least one portion of the pixel to produce a first blending result; and
   blending a 5-tap filtered value into the blending result.

2. The image filtering method of claim 1, wherein step of detecting the at least one portion of the edge comprises detecting vertical and horizontal edges.

3. The image filtering method of claim 1, wherein the step of detecting the at least one portion of the edge detects strong edges.

4. The image filtering method of claim 1, wherein the step of detecting the at least one portion of the edge detects the difference between a pixel to be filtered and the pixels used for the low pass filter.

5. The image filtering method of claim 1, wherein the step of filtering the at least one portion of the pixel utilizes at least one of horizontal low pass filter or vertical low pass filter.

6. The image filtering method of claim 1, wherein the step of filtering the at least one portion of the pixel utilizes a 3-tap filter, wherein the 3-tap filter filters at least one of immediate right and left pixels or immediate upper and lower pixels.

7. The image filtering method of claim 6 further comprising utilizing a 5-tap filter, wherein the 5-tap filter filters at least one of an at least one portion of a second nearest pixel to the right and the left or an at least one portion of a second nearest pixel on the upper and lower side.

8. The image filtering method of claim 1, wherein the step of blending comprising the step of determining a blending value for at least one filter.

9. The image filtering method of claim 8, wherein the blending value is at least one of:
   increased when the detected edge is found in a neighbor;
   increased when quantization parameter for encoding a macroblock is large; or
   decreased when the filter causes blurring.

10. The image filtering method of claim 1 further comprising detecting noise.

11. The image filtering method of claim 1, wherein the image filtering method utilizes two different low pass filters and two different blending factors to filter at least a portion of an image.

12. An image filtering apparatus, comprising:
    means for detecting at least one portion of an edge, wherein the portion of the edge provides an indication that ringing artifact are probable, wherein the means for detecting the at least one portion of the edge detects an area wider than a DCT Block; means for subjecting at least one portion of a pixel, related to the at least a portion of the edge, to a low pass filter to produce a filtered pixel; and means for blending the filtered pixel with a value relating to the filter prior to filtering to produce a filtered image, wherein the means for blending comprising the steps of: blending a 3-tap filtered value into the at least one portion of the pixel to produce a first blending result; and blending a 5-tap filtered value into the blending result.

13. The image filtering apparatus of claim 12, wherein the means for detecting the at least one portion of the edge comprises means for detecting vertical and horizontal edges.

14. The image filtering apparatus of claim 12, wherein the means for detecting the at least one portion of the edge detects strong edges.

15. The image filtering apparatus of claim 12, wherein the means for filtering the at least one portion of the pixel utilizes a low pass filter.

16. The image filtering apparatus of claim 15, wherein the means for detecting the at least one portion of the edge detects the difference between a pixel to be filtered and the pixels used for the low pass filter.

17. The image filtering apparatus of claim 12, wherein the means for filtering the at least one portion of the pixel utilizes at least one of horizontal low filter or vertical low pass filter.

18. The image filtering apparatus of claim 12, wherein the means for filtering the at least one portion of the pixel utilizes a 3-tap filter, wherein the 3-tap filter filters at least one of immediate right and left pixels or immediate upper and lower pixels.

19. The image filtering apparatus of claim 18 further comprising utilizing a 5-tap filter, wherein the 5-tap filter filters at least one of an at least one portion of a second nearest pixel to the right and the left or an at least one portion of a second nearest pixel on the upper and lower side.

20. The image filtering method of claim 12, wherein the means for blending comprises a means for determining a blending value for at least one filter.

21. The image filtering apparatus of claim 20, wherein the blending value is at least one of:
    increased when the detected edge is found in a neighbor;
    increased when quantization parameter for encoding a macroblock is large; or
    decreased when the filter causes blurring.

22. The image filtering apparatus of claim 12 further comprising a means for detecting noise.

23. The image filtering apparatus of claim 12, wherein the image filtering apparatus utilizes two different low pass filter and blending factors to filter at least a portion of an image.

24. An image filtering system comprising a non-transitory computer readable medium comprising instructions, when executed by a processor, causes the processor to perform a method comprising:
    detecting at least one portion of an edge, wherein the portion of the edge provides an indication that ringing artifact are probable, wherein in the detecting step at least one portion of the edge detects an area wider than a DCT Block;
    subjecting at least one portion of a pixel, related to the at least a portion of the edge, to a low pass filter to produce a filtered pixel; and
    blending the filtered pixel with a value relating to the filter prior to filtering to produce a filtered image, wherein the blending step comprising the steps of:
    blending a 3-tap filtered value into the at least one portion of the pixel to produce a first blending result; and
    blending a 5-tap filtered value into the blending result.

\* \* \* \* \*